United States Patent [19]
Thompson

[11] 3,736,952
[45] June 5, 1973

[54] FIRE HOSE RACK

[75] Inventor: William Stanley Thompson, Elkhart, Ind.

[73] Assignee: Elkhart Brass Manufacturing Co., Inc., Elkhart, Ind.

[22] Filed: Sept. 30, 1971

[21] Appl. No.: 185,218

[52] U.S. Cl. ............................................. 137/355.28
[51] Int. Cl. ............................................. B65h 75/36
[58] Field of Search .................... 137/355.18, 355.28

[56] References Cited

UNITED STATES PATENTS

| | | | |
|---|---|---|---|
| 3,338,260 | 8/1967 | Thompson | 137/355.28 |
| 1,870,322 | 8/1932 | Brown | 137/355.18 |
| 3,670,763 | 6/1972 | Magdars | 137/355.18 |
| 1,156,706 | 10/1915 | Nuhring | 137/355.18 |
| 2,634,071 | 4/1953 | Lund | 137/355.28 X |
| 2,719,752 | 10/1955 | Dodge, Jr. et al. | 137/355.18 |
| 2,756,101 | 7/1956 | Cauffman | 137/355.18 |

*Primary Examiner*—Samuel Scott
*Attorney*—Eugene C. Knoblock

[57] ABSTRACT

A fire hose rack having an arm swiveled laterally on a vertical support and providing releasable means for supporting spaced points of a fire hose and a clamp for a portion of the hose to prevent water flow through the hose until intentionally released by a pull on the hose when released from its supports. The hose clamping action occurs at a return bend of the hose located between an abutment on the arm and a clamp bar pivoted to the arm and retained in clamping position by a rotatable retainer normally engaging the clamp bar at a surface having a recess which permits release of the bar when the retainer is rotated in response to tensioning of the hose tending to straighten the hose and acting to deflect a finger projecting radially of the retainer and engaged by the hose.

5 Claims, 10 Drawing Figures

PATENTED JUN 5 1973 3,736,952
SHEET 1 OF 3
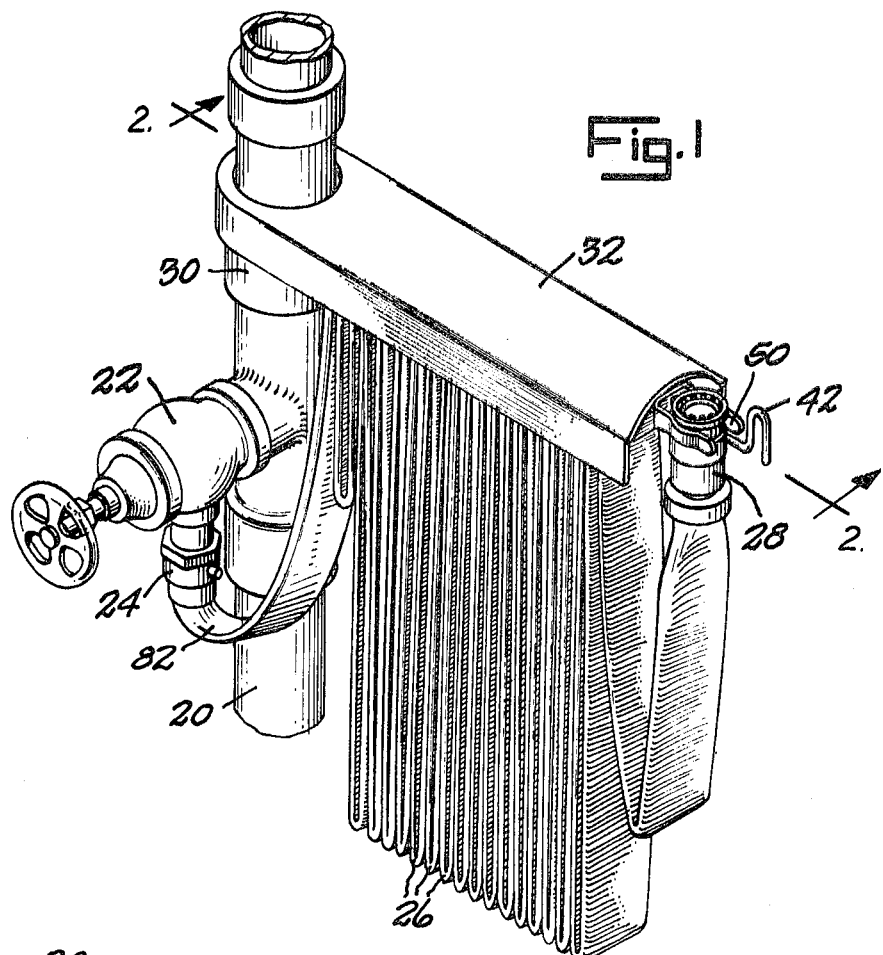
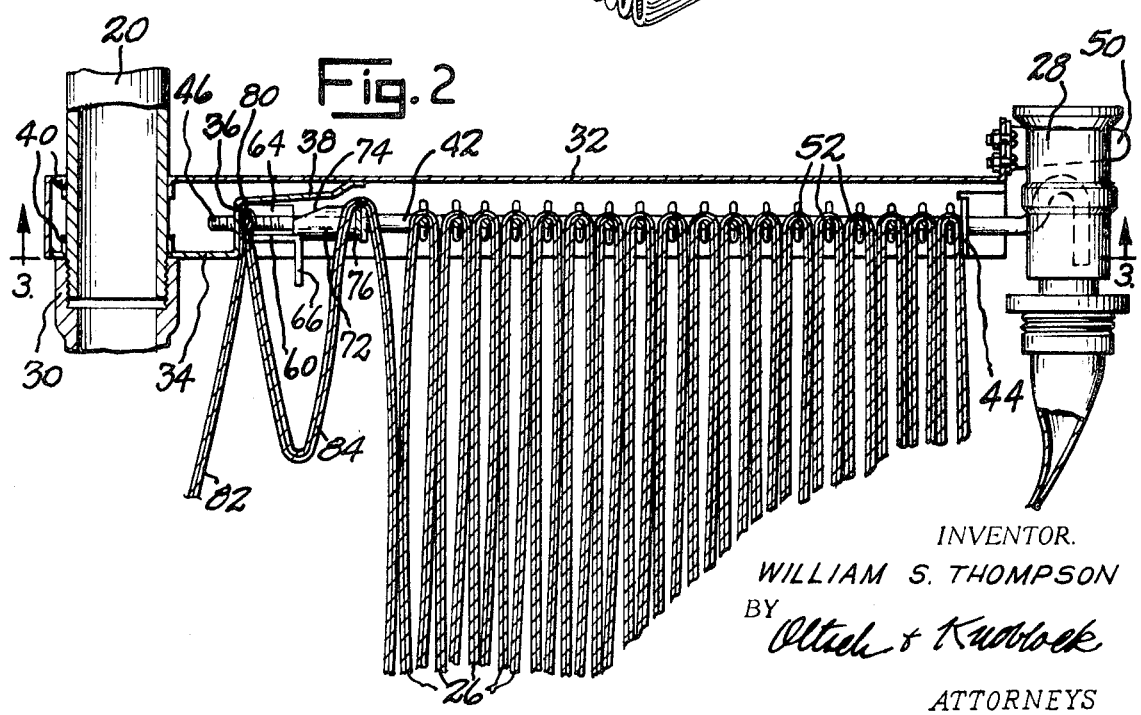
INVENTOR.
WILLIAM S. THOMPSON
BY Oltsch + Knoblock
ATTORNEYS

PATENTED JUN 5 1973 3,736,952

INVENTOR.
WILLIAM S. THOMPSON
BY Ollich + Knoblock
ATTORNEYS

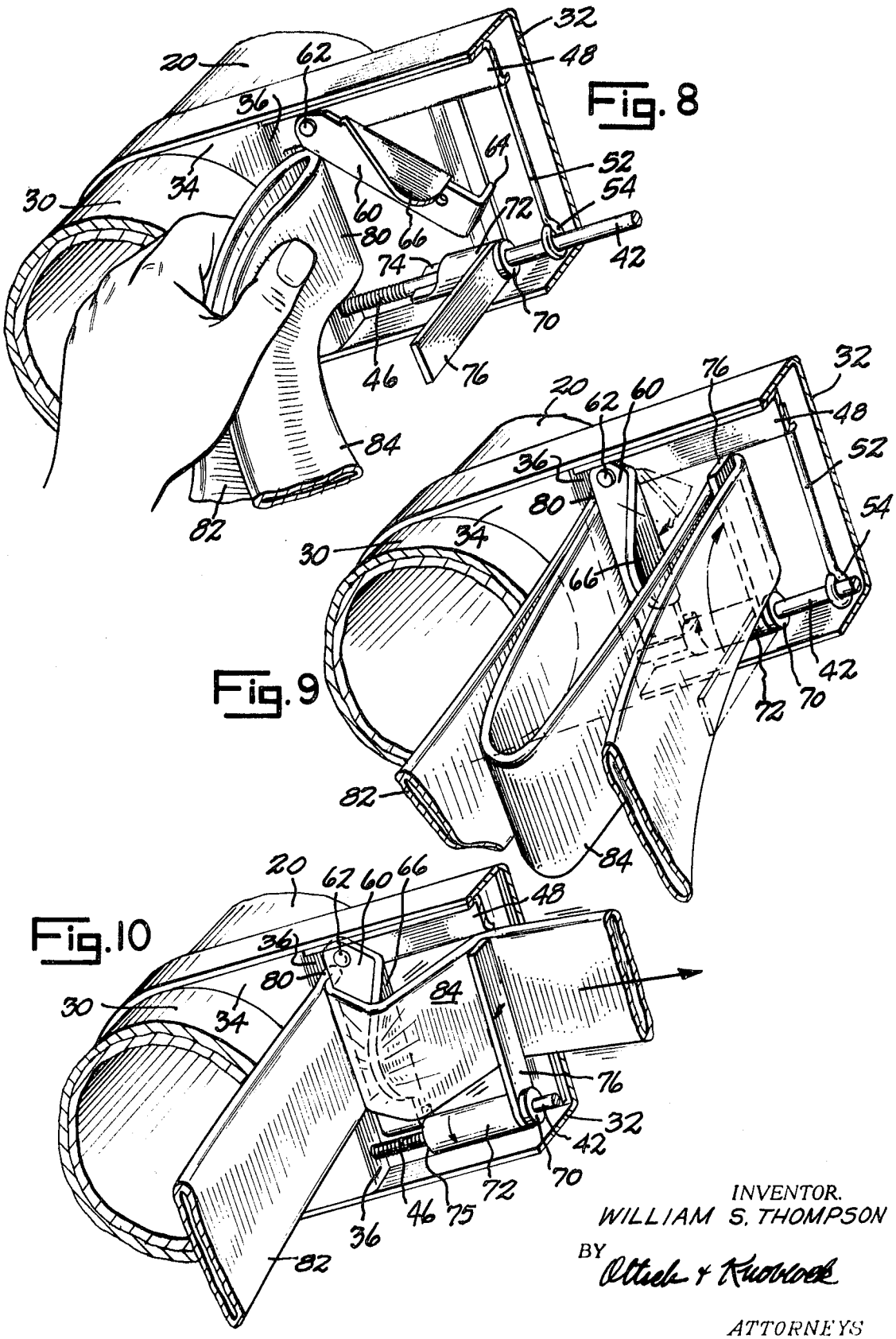

FIRE HOSE RACK

This invention relates to improvements in fire hose racks and more particularly to fire hose racks located in buildings and adapted for use by occupants of the building, as well as by trained or professional firemen.

Fire hose racks are usually positioned at a location fairly central with respect to the space in a building to be protected by use thereof, and also are located in a readily accessible position, but normally out of the way with respect to traffic in a building. Such locations require that the unit be manipulable through a wide range, that is to accommodate extension of the hose in different directions from the rack.

In use of the device, the rack must permit a water supply valve to be opened at the time a nozzle connected to a hose carried by the rack is grasped, and the rack must retain a portion of the hose in a clamped or gripped position adequate to ensure that water will not be discharged therefrom as the nozzle is carried and the hose is pulled to a position of use, so that damage from water does not occur in portions of the building between the location of the rack and the location of the fire. At the same time, the device must accommodate release of the hose therefrom by manipulation of the hose by the user so as to deliver water for discharge through the nozzle as soon as the user brings the nozzle to the use position.

Various types of racks for such usage have been developed heretofore and each with which I am familiar has had some disadvantage. One widely used type of fire hose rack is disclosed in U.S. Pat. No. 2,756,101, dated July 24, 1956, wherein a wedging type of device is utilized to clamp the hose. It has been found in the use of such devices that the wedge grips the hose so tightly when water under pressure is admitted to the hose ahead of the clamp that the device may not release upon exertion of pull thereon by the person holding the nozzle, and the efforts of two or more men may be required to pull the hose with a force adequate to release the clamp. Another common experience with racks having the wedge type of clamp is that the positioning of the clamp so that the exertion of one man pulling on it is sufficient to release, does not provide an effective flow-preventing condition when the valve is opened.

Another type of hose clamp is disclosed in U.S. Pat. No. 3,338,260. This device has the disadvantage that it must be mounted in a cabinet, so that the nozzle is not readily grasped for use.

It is the primary object of this invention to overcome the defects and limitations of prior hose racks.

A further object is to provide a self-contained unit for storage of the hose and clamping thereof in non-flow condition, which does not require the use of a cabinet or the opening of a door, and in which the fire hose nozzle and the hose are readily accesible at all times.

A further object is to provide a device of this character capable of clamping a return bent portion of a hose to retain a water pressure of 150 p.s.i. for three minutes with no wetting of the hose past the first loop, that is, past the clamp.

A further object is to provide a device of this character having an effective readily releasable hose clamp which is applicable to a hose carrier adapted to swing around a stand pipe or supply pipe through an angle of at least 180 degrees to accommodate itself to a pull in any direction of use relative to the supply pipe to which the hose is connected.

A further object is to provide a device of this character which can be attached to a stand pipe riser and does not require anchorage or support by a wall.

A further object is to provide a device of this character which accommodates use of pre-folded hose, so that looping of the hose is not required to be performed at the site, i.e. the rack can be installed while the hose is supported thereon.

A further object is to provide a device of this character which positions the hose nozzle in a readily accessible, visible and convenient location.

A further object is to provide a device of this character which will release the hose to permit water flow through the hose with minimum exertion, while at the same time effectively retaining water under pressure in a limited portion thereof until a direct pull is imparted to free the hose from the clamp.

A further object is to provide a device which can be inspected as to its hose clamp action by a pull upon the portion of the hose between the stand pipe and the clamp.

Other objects will be apparent from the following specification.

In the drawing:

FIG. 1 is a perspective view of the device.

FIG. 2 is a longitudinal vertical sectional view of the device taken on line 2—2 of FIG. 1.

FIG. 8 is a fragmentary perspective view illustrating one step in the clamping of a hose in the rack.

FIG. 9 is a fragmentary perspective view illustrating another step in the installation of a hose upon the rack.

FIG. 10 is a perspective view illustrating the manner in which forces applied in pulling the hose act upon the clamp to release it.

My improved hose clamp utilizes an arm mounted rotatably upon a stand pipe or vertical support adjacent a valve and adapted to swing thereabout. The arm carries a plurality of members adapted to support loops of the hose and a clamp at its free end to support a nozzle at one end of the hose. The other end of the hose is connected to a valve mounted upon the stand pipe or supply line, and a return bent part of the hose is gripped releasably at a point adjacent the valve to clamp it and maintain it closed to prevent discharge of liquid therethrough when the valve is opened, until the operator desires to release the clamp. The clamp includes a pivoted clamping bar which is retained in clamping position by a retainer rotatable on a member extending lengthwise of the arm and having a retaining surface engaging the clamping bar in one rotative position of the retainer, which surface is interrupted at a position thereof for releasing the clamp in another rotative position of the retainer. The retainer has a finger engaged by the hose and swung from retaining to releasing position upon exertion of a pull upon the hose.

In the preferred form of the device selected for illustration a vertical stand pipe or supply line 20 may be provided with a valve 22 to which is connected a fitting 24 on the end of a fire hose 26 which has a fire nozzle 28 connected thereto at its free end.

Figure 6:
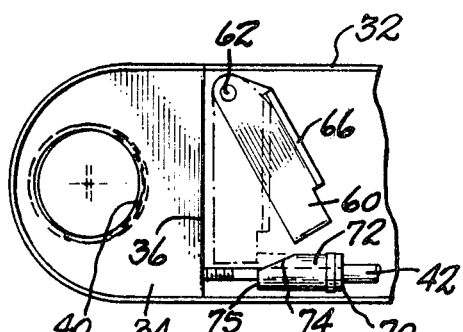
FIG. 6 is a fragmentary bottom plan view illustrating the hose clamp.
Figure 7:
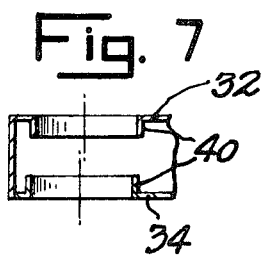
FIG. 7 is a fragmentary sectional view of the arm structure taken on line 2—2 of FIG. 1.

The stand pipe 20 or a fitting on the outlet of the valve 22 preferably includes a collar 30 providing an annular shoulder or abutment to support a rigid horizontal arm 32 or the arm may be mounted to rotate on a wall bracket or rack nipple. The arm 32 preferably is of inverted channel shape in cross section and includes at one end a bottom plate 34 fixed thereon and providing a transverse wall or abutment 36 intermediate its end. Plate 34 terminates in portion 38 fixedly secured to the central portion of the arm 32 at its end. Arm 32 and bottom plate 34 are provided with apertures preferably outlined by tubular flanges 40. These apertures are of a size to fit rotatably upon the stand pipe 20, bearing upon the upper end of the collar 30, or may mount a ring or bearing (not shown) encircling the pipe. In the preferred form, as illustrated in FIGS. 6 and 7, the tubular flanges 40 may be slightly displaced from axial alignment, with the spacing of the aperture in the bottom plate 34 from the adjacent end of the arm preferably being slightly less than the spacing of the flange 40 in the top of the aperture in the top wall.

Figure 3:
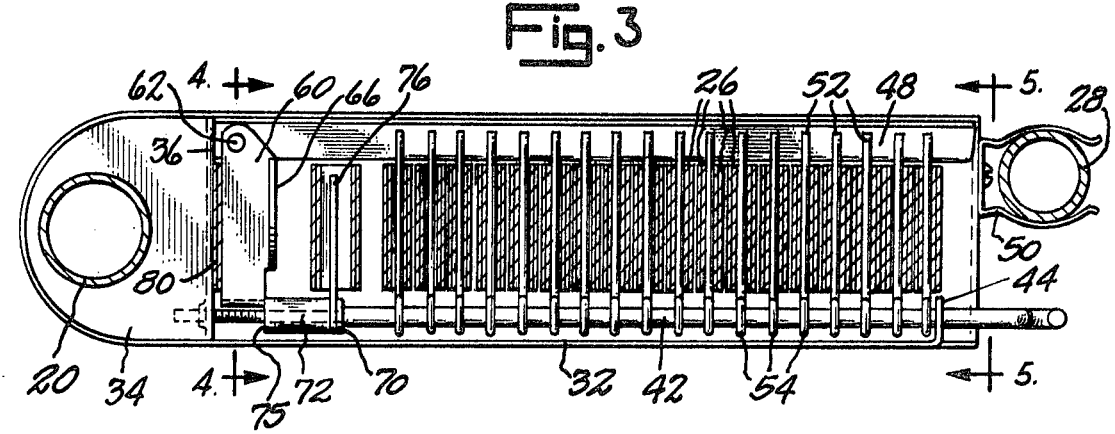
FIG. 3 is a horizontal sectional view taken on line 3—3 of FIG. 2.

An elongated rod 42 extends lengthwise along one side of the arm 32, being journaled in an aperture in a tongue 44 struck from the arm 32 at the end thereof spaced from the stand pipe. The vertical wall or abutment 36 has a tapped opening within which the screw threaded end 46 of the rod 42 engages in the operating position of the parts, as illustrated in FIGS. 2 and 3. The rod 42 is positioned adjacent one side of and within the arm 32. A longitudinal wall or flange 48 is carried by the side of the arm 32 opposite the rod 42 and is located in the arm. A bracket 50 is preferably carried by the outer or free end of the arm 32 and is adapted to releasably support the nozzle 28.

A plurality of transversely extending hose supporting pins 52 have eyelet ends 54 which loosely encircle the rod 42. Pins 52 are of a length to bear upon the flange 48 at their free ends when positioned transversely of the arm 32. The loop or eyelet ends 54 of the pins have an inner diameter substantially greater than the diameter of the rod 42, so that the pins may be swung to angular position which frees the end thereof from the longitudinal flange 48.

Figure 4:
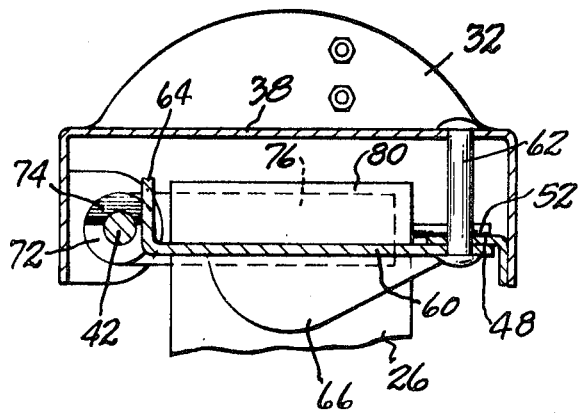
FIG. 4 is a vertical transverse sectional detail view taken on line 4—4 of FIG. 3.
Figure 5:
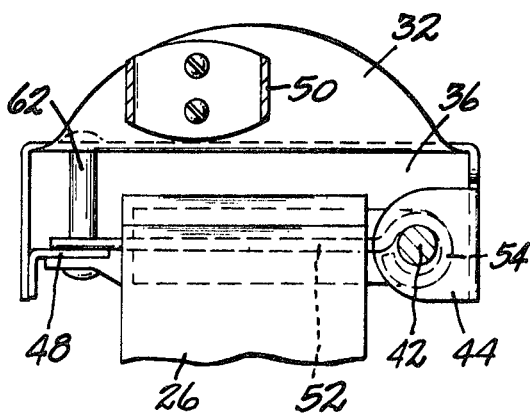
FIG. 5 is a vertical transverse sectional view of the device taken on line 5—5 of FIG. 3.

A clamp bar 60 is pivoted at 62 at one end thereof to the flange 48 in slightly spaced relation to the wall or abutment 32 and is of a length to terminate adjacent to but spaced from rod 42. The free end of clamp bar 60 terminates in an upturned end flange 64 located adjacent to the rod 42 when the clamp bar is positioned transverse of the arm 32. Clamp bar 60 also includes a downwardly projecting longitudinal flange or hose abutment 66 extending for the major portion of the length thereof and preferably having a curved bottom edge, as best seen in FIG. 4.

Rod 42 carries a fixed abutment 70 spaced from the screw threaded end 46 thereof. A retainer 72, preferably of tubular character is slidable and rotatable upon the rod 42 and is located between the abutments 70 and 36. Tubular retainer 72 is characterized by a bevel or recessed surface 74 at the end portion thereof adjacent the shoulder 36 which interrupts the transverse end surface 75 of the retainer. The retainer carries a laterally projecting finger 76 at its opposite end. Finger 76 projects from tubular retainer 72 on a radius displaced approximately 90 degrees from the radius on which the beveled or recessed surface 74 is centered.

In the use of the device, assuming that the hose 26 mounts the nozzle 28 and is connected by fitting 24 to the valve 22, and that the arm 32 is rotatably mounted upon the stand pipe 20 to bear upon the fitting 30, a folded or transversely return bent portion 80 of the hose spaced a short length 82 from the fitting 24 is inserted in the arm 32 engaging the abutment or shoulder 36, as illustrated in FIG. 8, while the clamp bar 60 is swung clear of shoulder 36. Then the clamp bar 60 is swung to a position transverse of the arm to engage the bent hose portion 80. A hose loop 84, preferably of short length, is then formed and passed over the retainer finger 76 while the latter is swung to the full line position illustrated in FIGS. 9 and 10 from the depending position illustrated in FIG. 8. By this action the transverse abutment surface 75 of the tubular retainer 72 engages the free end of the clamp bar 60 and its end flange 64 to retain the clamp bar in the hose-clamping position illustrated in FIGS. 9 and 10. Thereupon the rod 42 may be rotated to advance the abutment 70 and retainer 72 endwise toward the abutment 36, thereby swinging the clamp bar 60 toward the abutment 36 to effect a clamping action upon the bent hose portion 80 between clamp bar 60 and abutment 36 adequate to retain the hose in a position to prevent flow of water under line pressure therepast when the valve 22 is opened. Thereupon the remainder of the hose is looped in serpentine fashion to be supported upon the transverse pins 52, and the nozzle 28 is mounted upon the bracket 50, thus conditioning the device ready for use. It will be understood that the valve 22 will normally be closed so that no liquid is contained in the hose loop or length 82.

When use of the hose is required, an operator grasps the nozzle 28 and opens the valve 22, thus permitting water to enter the hose portion 82. No water can be discharged from the hose, however, because of the clamping of hose portion 80 by the clamp member 60. The operator then moves to the site of a fire carrying the nozzle and pulling upon the hose to release successive loops of the hose from the hose support pins 52. When the location of the fire is reached, a further pull is exerted upon the hose to disengage it from all of the pins 52 and then to pull the hose lengthwise in the direction of the arrows in FIG. 10, thereby reducing the length of the loop portion 84 of the hose until it engages the cam flange 66, as seen in FIG. 10, so that the portion of the hose between clamp flange 66 and retainer finger 76 extends at an angle to the arm 32. A further pull upon the hose, after the hose reaches the position illustrated in FIG. 10, tends to straighten the hose between the nozzle and the cam 66 and thereby introduces a force upon the retainer finger 76 in the direction of the arrows shown in FIG. 10 to rotate the retainer 72. A slight rotation of the retainer 72 brings its recess 74 into register with the end of the clamp bar 60, thereby releasing the clamp bar for swinging movement to disengage the portion 80 of the hose and permit water to flow through the hose.

It will be observed that by virtue of the swinging support of the arm 32 upon the stand pipe the arm will automatically be positioned in the direction in which the hose is extended so that it is not necessary to exercise care as to the direction in which force is exerted upon the hose for clamp releasing action. Also it will be observed that the unit is self contained and does not require any cabinet and the nozzle is readily grasped. The hose and its clamping action is readily inspected and the effectiveness of the clamp arm in clamping the hose can be tested by pulling on the hose portions 82 and 84. The pull required to be exerted to disengage the hose from the clamping bar to accommodate water flow through the hose is easily within the capability of a single individual by virtue of the rotatable mount of the retainer 72, and further by virtue of the cooperative relation of the longitudinal cam flange 66 of the clamp bar 60 and the finger 76 of the retainer, tending to straighten the hose as pull is exerted and thereby effecting rotation of the retainer finger 76 to clamp bar releasing position.

While the preferred embodiment of the invention has been illustrated and described, it will be understood that changes in the construction may be made within the scope of the appended claims without departing from the spirit of the invention.

What I claim is:

1. In a fire hose rack having an arm swingable laterally on a vertical support and carrying a plurality of releasable normally substantially parallel supports for suspending spaced parts of a fire hose connected to a water supply line under control of a valve and a support for a hose nozzle, the improvement comprising a transverse abutment carried by said arm adjacent said support, a clamp bar pivoted to said arm to swing toward and from a position wherein a surface confronts said abutment to engage the hose for clamping a return bent portion of said hose against said abutment, a retainer rotatably carried by said arm on an axis extending longitudinally of said arm and having a transverse end surface engaging said clamp bar in one rotative position of said retainer and interrupted by a beveled end portion which accommodates free swinging of said clamp bar in another rotative position of said retainer, and a finger projecting from said retainer in a hose supporting position when said transverse retainer surface engages said clamping bar and swinging to rotate said retainer to position said beveled end portion adjacent said clamp bar to accommodate free swinging of said clamp bar in response to tension on the portion of the hose supported thereby.

2. The combination defined in claim 1, and means for shifting said retainer to urge said clamp bar toward said abutment.

3. The combination defined in claim 1, wherein said clamp bar includes a second longitudinal hose engaging portion spaced from said first named hose engaging surface and cooperating with said retainer finger to position a portion of said hose therebetween in inclined relation to said arm when said hose portion between said finger and first hose engaging surface is tensioned after release of said hose from said releasable supports.

4. The combination defined in claim 1, wherein said retainer has a bore therethrough, and a rod extending lengthwise of said arm and through said retainer bore, said rod having a retainer abutment, and means for advancing said rod endwise toward said first abutment.

5. The combination defined in Claim 4, wherein said retainer is elongated and said clamp engaging surface and said finger are located at opposite ends thereof.

* * * * *